(12) United States Patent
Prather et al.

(10) Patent No.: US 7,322,582 B2
(45) Date of Patent: Jan. 29, 2008

(54) ENHANCED SHOPPING CART WITH LOWERED CENTER OF GRAVITY AND FRAME THEREFOR

(75) Inventors: James G. Prather, Yorba Linda, CA (US); Patrick A. Maandag, Corona, CA (US)

(73) Assignee: Mind Wurx, LLC, Yorba Linda, CA (US)

( * ) Notice: Subject to any disclaimer, the term of this patent is extended or adjusted under 35 U.S.C. 154(b) by 371 days.

(21) Appl. No.: 10/645,820

(22) Filed: Aug. 18, 2003

(65) Prior Publication Data

US 2005/0012284 A1    Jan. 20, 2005

Related U.S. Application Data

(63) Continuation-in-part of application No. 10/622,386, filed on Jul. 17, 2003, now Pat. No. 7,182,349.

(51) Int. Cl.
*B62D 39/00* (2006.01)
(52) U.S. Cl. .......................... 280/33.991; 280/33.997; 280/DIG. 4
(58) Field of Classification Search ........... 280/33.991, 280/33.997, 47.34, 47.35, 47.38, 47.4, DIG. 4
See application file for complete search history.

(56) References Cited

U.S. PATENT DOCUMENTS 2,764,419 A * 9/1956 Enders .................. 280/33.997

(Continued)

*Primary Examiner*—Christopher P. Ellis
*Assistant Examiner*—Brian Swenson (74) *Attorney, Agent, or Firm*—Terrell P. Lewis (57) ABSTRACT

A new shopping cart includes a wheeled base having forward and rear portions, a pedestal formed on the base for supporting a container or basket thereon, where the pedestal is secured to the base at a location between the forward and rearward ends of the base, and the container is supported on the pedestal so that the rear of the container is disposed forwardly of the rear of the base, and the cart as a whole exhibits a lowered center of gravity. The cart also includes an upwardly extensive handle member, and the pedestal includes a surface for supporting the rear of the basket forwardly of the rear of the base. The basket is hung from the handle member at a location disposed a substantial distance from the upper part of the handle member. A pair of connecting rods attaches the handle member to the rear of the pedestal to support the latter against excessive longitudinal forces. A pair of vertically spaced apart horizontal hinge rods are mounted to the handle member, a first one of the hinge rods being located in the vicinity of the upper end of the handle member and the other of the hinge rods being disposed below the first one of the hinge rods, wherein the lower hinge rod pivotably secures the rear pivoting gate of the basket. The pedestal is supported to the base on resilient elements, and the storage space beneath the basket is essentially eliminated. A child seat is disposed in the rear of the basket at a height substantially below the height of the upper end of the handle member. Upstanding side extension panels are mounted atop the upper rim of the basket. A barrier panel is affixed to the handle and cooperates with the side extension panels to form a protection zone about the head and torso of a child sitting in the child seat. A merchandise carrier, disposed behind and below the basket, is mounted to the wheeled base and the pedestal. Various other merchandise carriers are included either behind the basket or within the basket.

27 Claims, 6 Drawing Sheets

U.S. PATENT DOCUMENTS

| | | | | |
|---|---|---|---|---|
| 2,903,269 A * | 9/1959 | Hennion | ................ | 280/33.995 |
| 3,112,934 A * | 12/1963 | Buczak | ................ | 280/33.991 |
| 3,361,438 A * | 1/1968 | Davis | ................ | 280/33.991 |
| 3,503,622 A * | 3/1970 | Romero | ................ | 280/33.993 |
| 5,350,182 A * | 9/1994 | Hurst | ................ | 280/33.996 |
| 5,401,042 A * | 3/1995 | Ruger | ................ | 280/33.997 |
| 5,507,507 A * | 4/1996 | Davidson | ................ | 280/33.991 |
| 5,553,876 A * | 9/1996 | Trubiano | ................ | 280/33.991 |
| 5,791,666 A * | 8/1998 | Mainard | ................ | 280/33.991 |
| 6,406,041 B1 * | 6/2002 | Rea | ................ | 280/33.992 |
| 6,644,674 B2 * | 11/2003 | Simard | ................ | 280/33.991 |
| 6,926,291 B1 * | 8/2005 | Ondrasik | ................ | 280/33.991 |

\* cited by examiner

ENHANCED SHOPPING CART WITH LOWERED CENTER OF GRAVITY AND FRAME THEREFOR

RELATED APPLICATIONS

This application is a continuation-in-part of applicant's application U.S. Ser. No. 10/622,386, filed on Jul. 17, 2003 now U.S. Pat. No. 7,182,349, and entitled SHOPPING CART WITH LOWERED CENTER OF GRAVITY AND FRAME THEREFOR.

FIELD OF THE INVENTION

This invention relates generally to wheeled shopping carts of the kind used in markets, and more particularly to a shopping cart that is an improvement over "conventional" shopping carts, the shopping cart of the invention including a frame having a handle portion and a base portion, a basket or similar container, and a pedestal mounted on the frame base portion and arranged thereon for supporting the bottom of the basket provided for holding goods to be purchased. The base portion of the frame has a rear wheel base that is wider than the wheel base typically found in the "conventional" carts normally found today in markets, and the base portion and pedestal are arranged so that the basket is supported closer to the ground than the basket of the "conventional" carts such that the center of gravity of the cart of the invention is substantially lower than the center of gravity in conventional carts, and the cart of the invention is therefore substantially more stable than the "conventional" carts. Further, the basket is mounted to the frame handle portion at a location lower than the mounting location of baskets in the "conventional" carts, thereby putting the child seat at a lower position relative to the ground. These physical enhancements have the effect of simultaneously lowering the center of gravity of the cart and rendering the cart more stable.

Various trays and shelves are included with the shopping cart of the present invention. In addition, upstanding side guard panels are mounted to the upper rear region of the basket for protecting a child in the child's seat of the basket against injury in the unlikely circumstance where the cart is caused to laterally tip over, or to prevent the child from reaching out of the cart and subjecting itself to injury resulting from contact with items or objects which the child ought not be in contact with.

BACKGROUND OF THE INVENTION

It has been well documented that "conventional" shopping carts of the kind typically found in supermarkets, department stores or other such stores where consumers select goods from in-store shelving and displays, are contributory in injuries and in some cases deaths of children who are seated or otherwise riding in the carts. For example, in February 1999, the Brain Injury Association of Oklahoma reported that, according to Dr. Gary Smith of Children's Hospital in Columbus, Ohio, the emergency room staff there was attending to 1-2 cases of shopping cart accidents per week. Dr. Smith reported that more than half the accidents were due to children standing in the carts while reaching or grabbing for something on a shelf. The 1999 report from the Brain Injury Association of Oklahoma noted that some carts tip over too easily due to their design—if a cart's handle is located too far back from the basket it can create a significant instability, especially with a child in the seat. The tendency for carts to tip over sideways is due to "a narrow wheelbase and a high center of gravity."

Most grocery stores, supermarkets and other large retail outlets provide shopping carts for their customers. Typically, a "conventional" shopping cart (note FIGS. 5 and 6 and the text below for a more detailed description) includes a frame supported above the ground by a base that includes caster assemblies. A rack or other package supporting member is generally pivotally supported by forward portion of the base, and a basket is secured to the frame of the shopping cart by hooks at the upper rear portion of the basket, so that the basket is cantilevered from the support frame.

The handle of the "conventional" shopping cart allows the shopper to stand behind the cart while pushing or pulling, and steering, the cart on the casters. Shopping carts are generally used for transporting goods to be purchased by a shopper walking through and shopping in a market or other retail establishment.

SUMMARY OF THE INVENTION

One aspect of the invention is to reposition the basket of the cart lower to the ground than in "conventional" carts while maintaining the handle of the cart at the height found in "conventional" carts, and to reposition the child seat in the basket at a location closer to the cart base than in "conventional" carts so that the cart of the invention exhibits a lower center of gravity than "conventional" carts.

Another aspect of the invention is to provide a barrier between the cart handle and the "zone" in which the child is seated so that, if the cart is caused to be tipped, the child's head and face will be protected against injury, while at the same time providing a protective cage about the zone in which a child will be seated when riding in the child's seat of the cart. Alternatively, the barrier will function to prevent the child from reaching out of the "zone" and subjecting its body to injurious or otherwise harmful conditions.

In still another aspect of the invention, as a result of the basket being lowered relative to the base of the frame to such an extent that the under-basket tray typically found in "conventional" carts is rendered unusable, the present invention provides various additional storage baskets as well as for a laterally extending tray disposed beneath and behind the cart basket.

Other aspects, advantages and features of the invention will become more apparent and better understood, as will equivalent structures which are intended to be covered herein, with the teaching of the principles of the invention in connection with the disclosure of the preferred embodiments thereof in the specification, claims and drawings.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a shopping cart of superior design and performance.

Figures 1, 2:
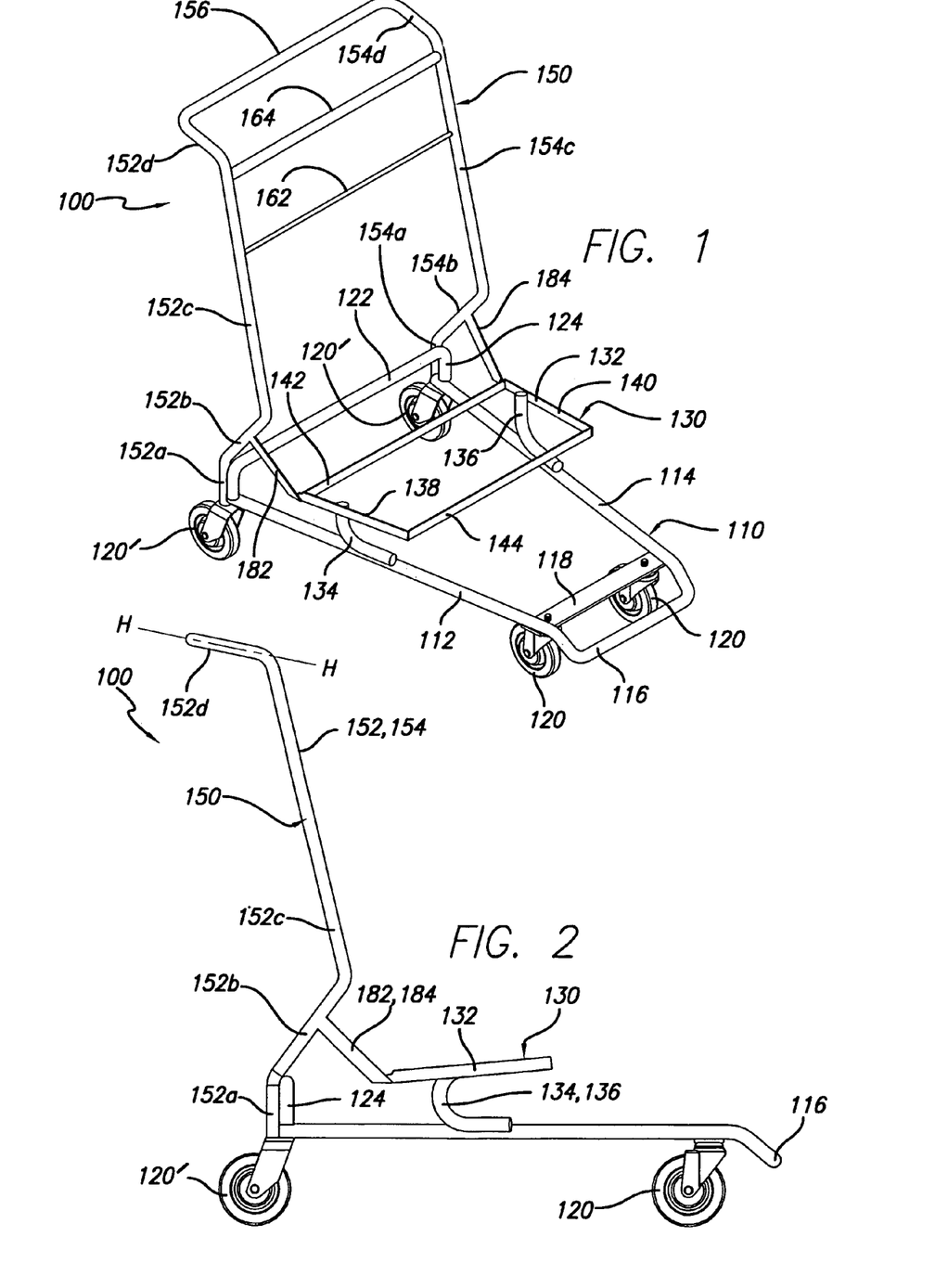
FIG. 1 is a front perspective view of the frame of the shopping cart of the present invention.
FIG. 2 is a side view of the shopping cart frame shown in FIG. 1.

Referring first to FIGS. 1 and 2, the cart frame 100 of the present invention includes a base assembly 110, a pedestal assembly 130 on the base assembly, and a handle assembly 150.

The base assembly 110 includes longitudinally disposed elongated side support members 112, 114 running from the rear of the cart frame to the front of the frame which are joined at the front of the cart in a nose member 116. A wheel plate 118, which is mounted to the support members 112, 114 just rearwardly of the nose member 116, supports a pair of wheel assemblies such as casters 120. A second set of casters 120' are mounted to the rear ends of the support members 112, 114, and a cross bar 122 may be provided for connecting the rear ends of the support members 112, 114 at the rear of the base assembly. The cross bar 122 extends laterally between the lower rear ends of the support members 112, 114, and includes vertical portions 124 connected together by a horizontally extending portion. The cross bar 122 has a length that is greater than the lateral distance between the rear ends of the support members or similar structure on "conventional" shopping carts, thereby rendering the wheel base on the cart of the present invention wider and more stable than the wheel base of "conventional" shopping carts.

Situated on and mounted to the base assembly 110 at a location between the front and rear of the base assembly is a pedestal assembly 130 which includes a platform 132 for supporting the rear portion of a basket or container, and a pair of platform support members 134, 136 mounted to the side support members 112, 114. The platform support members maintain the platform at a height spaced from the plane of the base side support members 112, 114 and at a distance sufficient to support the bottom of a basket above, and in close proximity to, the upper surface of the base assembly. Preferably, the platform support members 134, 136 are either configured with curvature or some other configuration that affords them some degree of resilience (note for example the U-shaped curvature shown in FIGS. 1 and 2), or they are fabricated from a material that exhibits resilient properties. The fabrication of the platform support members with a shape that exhibits inherent resilience or from a material that offers resilient properties ensures that the platform and the weight it supports will experience a cushioning effect, especially where the loads that the basket carries become increasingly weighty, or where items of large weight might be dropped or placed into the basket as the shopper makes his/her way through the market. The platform 132 comprises a frame structure including a pair of longitudinally extensive frame members 138, 140 each of which are disposed atop a respective side support member 112, 114 of the base, and a pair of laterally extending frame members 142, 144 joined to the longitudinal frame members 138, 140. The frame structure exhibits a rectangular or trapezoidal configuration and defines a plane that is arranged in spaced, nearly parallel, relation to the plane defined by the base of the cart frame. The plane of the platform 132 can also be arranged at a slight inclination to the plane of the base of the cart frame, as, for example, has been shown in FIGS. 2 and 4.

The handle assembly 150 comprises a pair of generally vertical tubular spine members 152, 154 extending upwardly from the rear end of the base support members 112, 114. Preferably, each of the spine members comprises a lower substantially vertical first section 152a, 154a, a second forwardly inclined section 152b, 154b, a third generally vertically oriented section 152c, 154c of length greater than the length of the first or second sections, and a fourth rearwardly angled section 152d, 154d of shorter length than the third section. The uppermost end of the fourth section of one spine is joined to the uppermost end of the other spine's fourth section by a transverse section 156 to form a U-shaped handle portion for the shopping cart frame. In the present invention, the cross member 122 could also be integrally merged into the spines of the handle assembly at or in the vicinity of the intersection between the first and second sections of the handle assembly. Preferably, the U-shaped handle portion defines a nearly horizontal plane (the handle portion can be provided with a slight upward tilt relative to the horizontal as shown in FIG. 2), and the handle portion will extend rearwardly of the shopping cart to allow a user to stand behind the cart to push or pull it.

Figure 4:
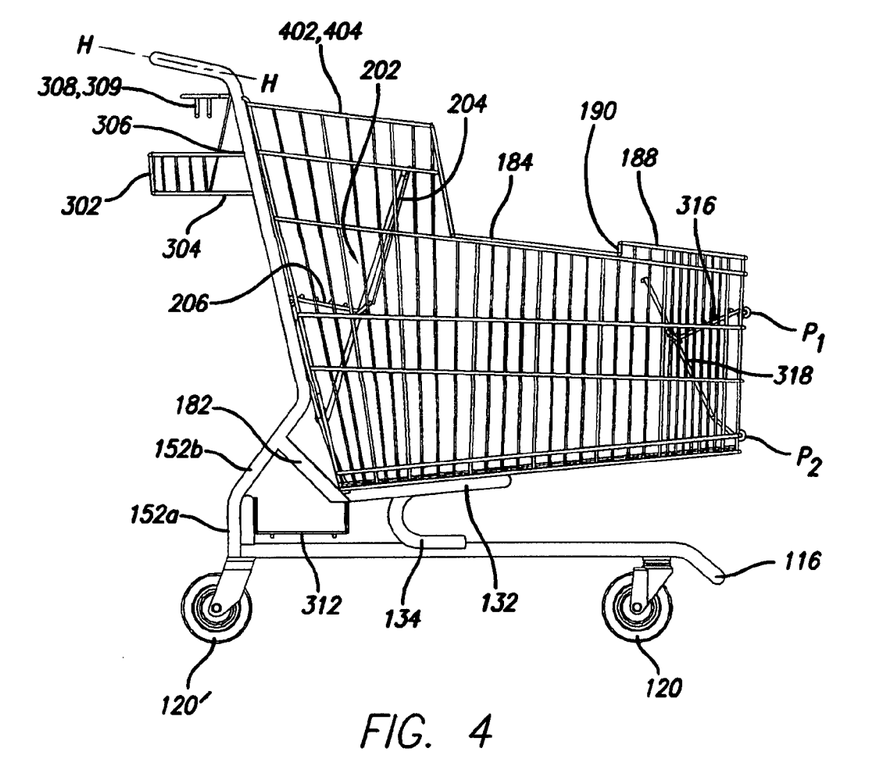
FIG. 4 is a side view of the shopping cart shown in FIG. 3.

The basket supporting platform 132 of the pedestal frame structure is positioned at a height, and preferably arranged at an angle relative to the handle spine members 152, 154 so that the rear end of the basket B (see FIG. 4) is seated adjacent the rearmost portion of the longitudinally extending members 138, 140 when the basket B is mounted to the third section 152c, 154c of the vertical spines of the handle. FIG. 4 shows that the plane defined by the platform 132 of the pedestal is not arranged parallel to the plane of the cart frame base, but rather is fashioned with the plane of the platform structure having a slight upward inclination. The handle spine portions and the frame structure of the pedestal form nearly a right angle relative to one another, and together support the rear of the basket forwardly of the rear of the base assembly.

Figures 7, 8:
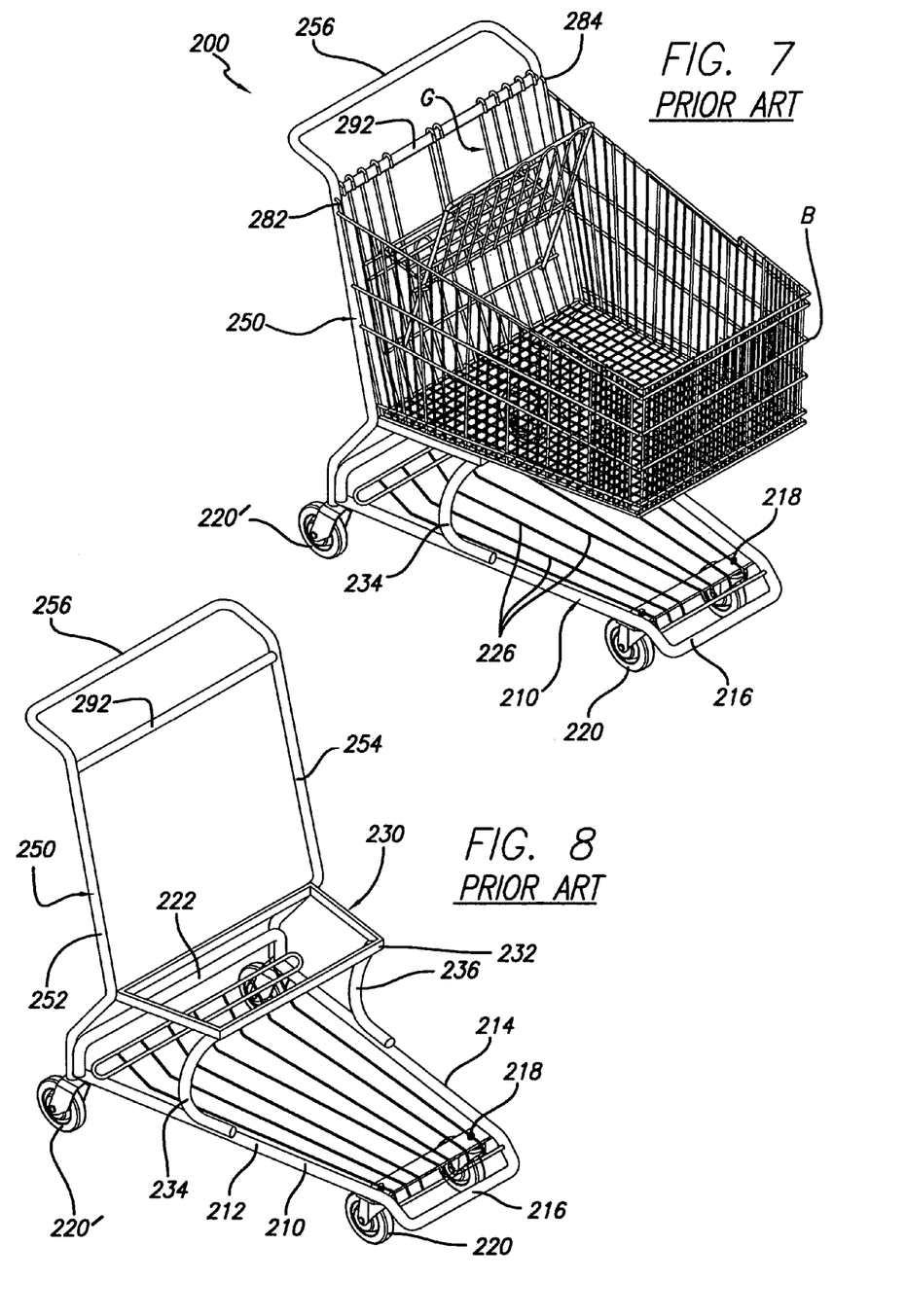
FIGS. 7 and 8 depict a "conventional" shopping cart and a "conventional" cart frame, respectively.

A representative "conventional" shopping cart and "conventional" shopping cart frame are shown in FIGS. 7 and 8. The cart 200 includes a base assembly 210, a pedestal assembly 230, and a handle assembly 250. The base assembly includes side support members 212, 214 joined together at the nose of the cart by member 216. A wheel plate 218 is mounted to the support members 212, 214 just rearwardly of the nose member 216, and supports a pair of casters 220, with a second set of casters 220' being mounted to the rear ends of the support members 212, 214. A cross bar 222 extends laterally between the rear ends of the support members. The length of the cross bar 222 is typically a standard fixed length that is shorter than the length of the cross bar 122 of the present invention. A basket supporting platform 232 is mounted to the rear of the base assembly, and is supported at its forward end by a pair of platform support members 234, 236 and is supported at its rearward end by a portion of the handle assembly spine members 252, 254. A basket B is suspended on the spine members 252, 254 by hooking wires 282, 284 located at the upper rear of the basket into openings (not shown) formed at a corresponding height on the two spine members. The rear portion of the basket engages, in an abutting manner, the lower portion of the vertical section of the spine members at the lower rear side of the basket, and the rear portion of the basket floor sits on the platform 232.

Figure 5:
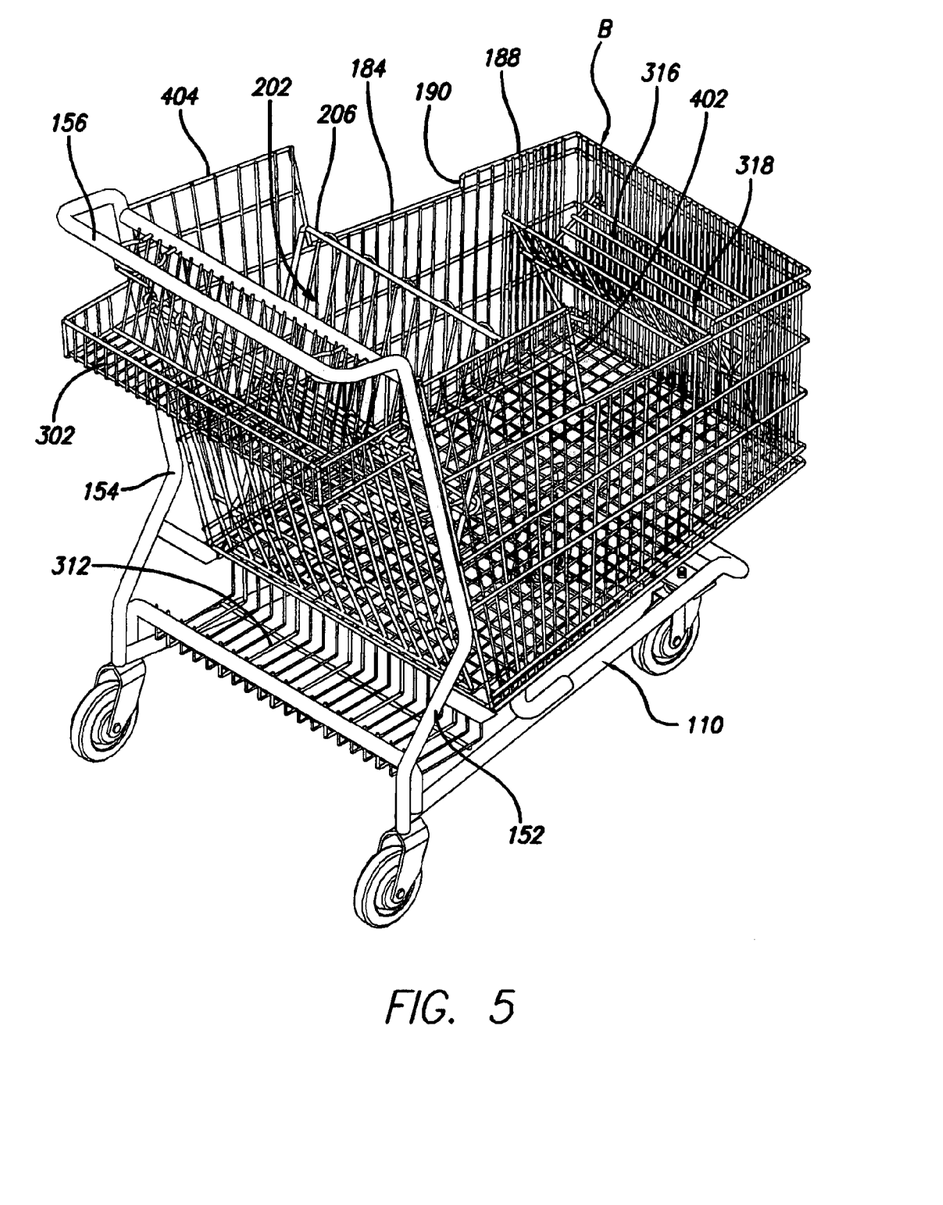
FIG. 5 is a rear perspective view of a the shopping cart shown in FIG. 2 and FIG. 3.
Figure 6:
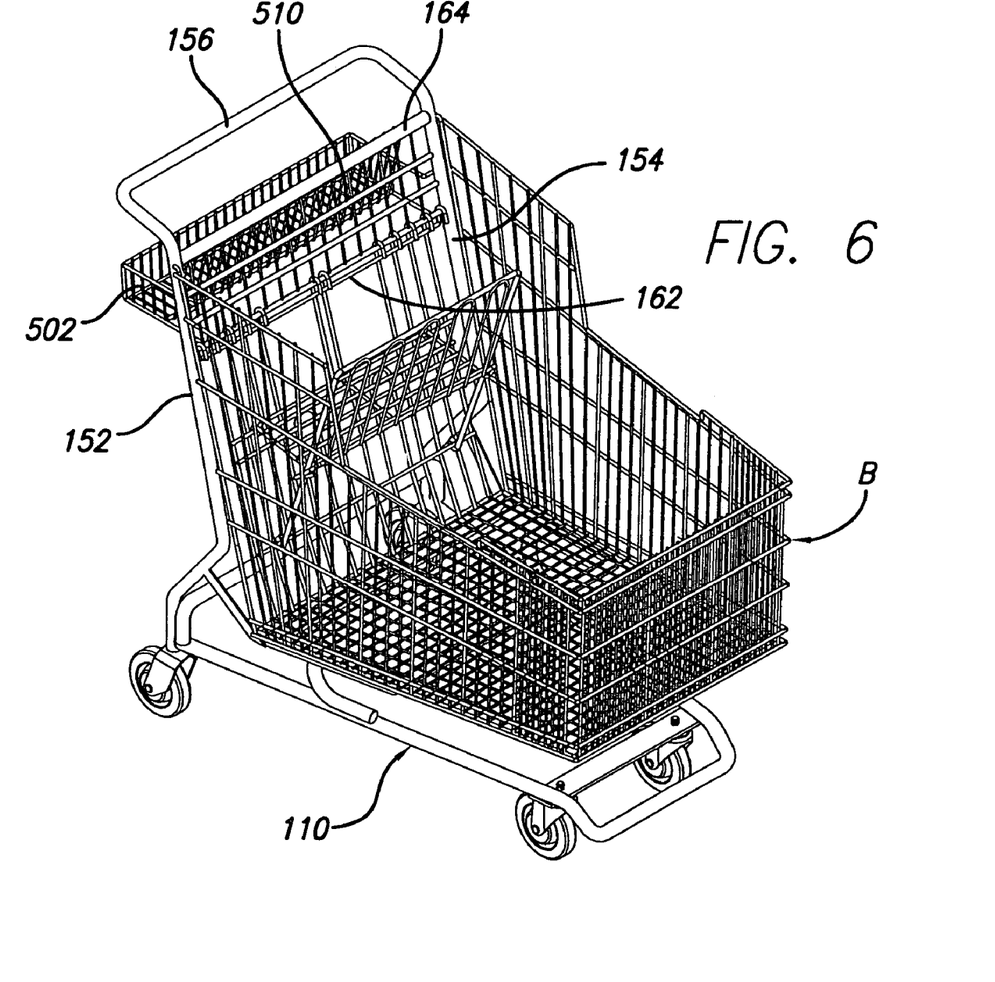
FIG. 6 is a front perspective view of another embodiment of the shopping cart of the present invention.

In the applicants' invention, the basket B is suspended on the spines 152, 154 at a position lower than the suspension location of baskets in the "conventional" shopping carts as depicted in FIGS. 5 and 6. The location of the basket B of the "conventional" shopping cart shown in FIG. 5 is at or immediately below the horizontal transverse member 262, which corresponds in the present invention to the second horizontal transverse member 164 shown in FIGS. 1 and 3. In the present invention, the position of the basket B is at a height equal to or just below the first horizontal transverse member 162, which is located at a substantial distance below the second horizontal transverse member 164.

Further, in "conventional" shopping carts, the rear panel G of the cart basket B (known in the art as the "rear gate") is pivotally mounted to the horizontal transverse member 292 disposed between and attached to the upstanding tubular spines of the handle assembly.

Figure 3:
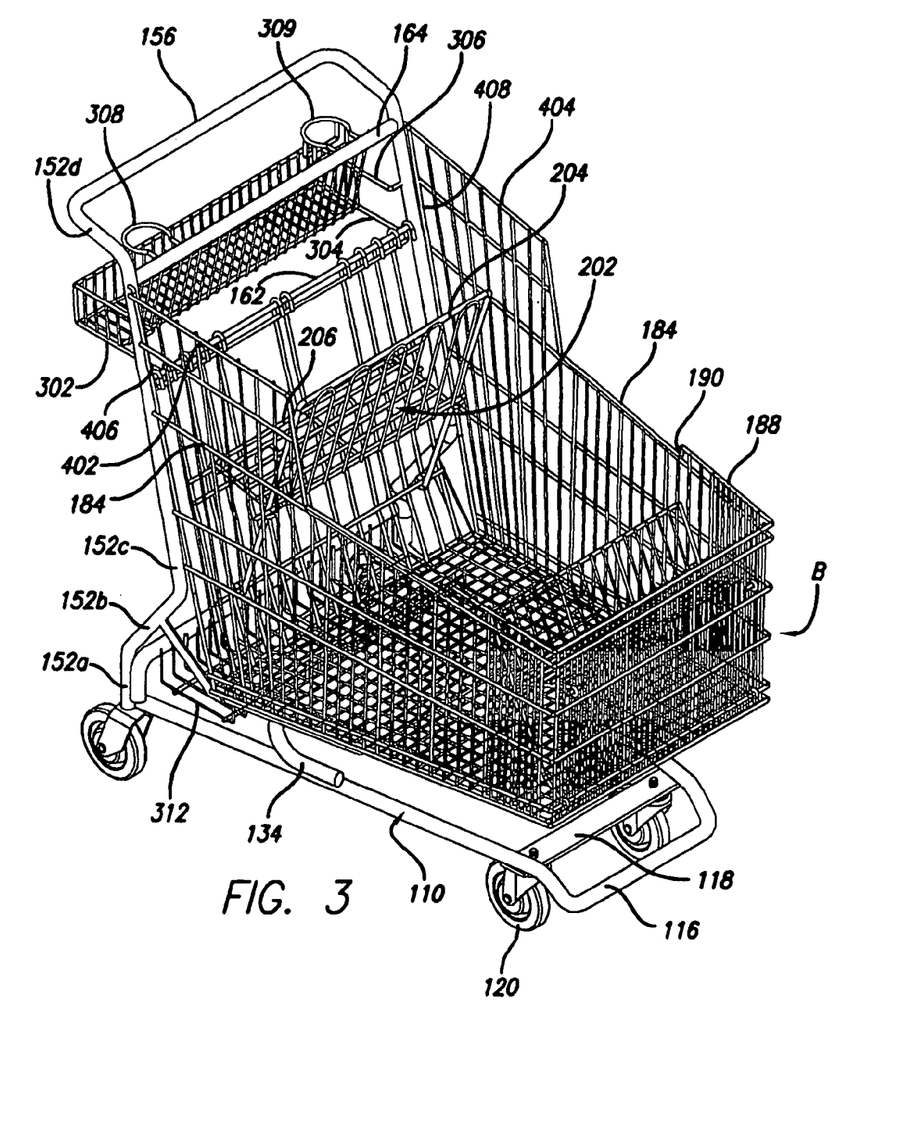
FIG. 3 is a front perspective view of one embodiment of the shopping cart of the present invention.

Referring to FIGS. 3 and 6, it can be seen that in the cart of the present invention, the rear gate G of the basket B is pivotally mounted on the first horizontal transverse member 162, which is located substantially below the second horizontal transverse member 164 located in the vicinity of the handle portion 156. The second horizontal transverse member 164 is positioned at the same height as the member 292 in the "conventional" cart shown in FIGS. 7 and 8. Thus, in the present invention, the height of the basket B, supported on the tubular spines 152, 154 is substantially lower relative to the base 110 than in "conventional" shopping carts thereby resulting in a lowered center of gravity for the shopping cart of the present invention.

Again, in contrast with "conventional" shopping carts, in the present invention, the gate G is pivotally mounted to the first transverse member 162. Moreover, the upper edge 184 of the basket B in the cart of the present invention is located substantially below the plane of the U-shaped handle portion 156 and the second horizontal transverse member 164 (to which the pivoting gate in "conventional" shopping carts is mounted). FIG. 4 shows that the upper edge 184 of the basket in the present invention is substantially below the plane "U" of the U-shaped handle portion 156.

Disposed between the pedestal 130 and the second section 152b of the tubular vertical spines on opposite sides of the cart base are connecting rods 182, 184 provided for assisting in absorbing stresses applied to the pedestal in longitudinal and transverse directions when goods are placed, dropped or thrown in the basket, as well as for rigidifying the pedestal against downward movement. The connecting rods are mounted to the second section of the spines and extend downwardly and forwardly into engagement with, and secure attachment to, the rear of the pedestal.

FIGS. 3-5 show a child's seat 202 in the cart basket B of the present invention that includes a back portion 204 and a seat portion 206. The child's seat is mounted to the cart rear gate G, and is pivotable between a non-functional, collapsed, position in which the back portion 204 of the seat is disposed adjacent the rear gate G of the cart basket and a functional, deployed, position in which the back of the seat is pivoted forwardly. The seat portion 206 extends between the rear gate G and the seat back 204 when the child's seat is disposed in its functional, deployed, position (as shown in FIG. 4). It is important to note that by having lowered the basket B on the frame relative to the plane "H" of the handle (FIG. 4), the child's seat has also been lowered relative to the plane "H" of the handle, and the significance of this is that it further contributes to the lowering of the center of gravity of the shopping cart of the present invention.

FIGS. 3-5 illustrate, in a shopping cart according to the present invention, merchandise carriers in addition to the basket B for use with the shopping cart.

In one instance, for example as shown in FIGS. 3-6, a basket or tray 302 can be provided beneath and behind the handle. The basket or tray 302 is mounted to the spines 152 and 154 by way of mounting elements 304 and 306 located on each side of the tray 302, which are secured below the handle to respective ones of the spaced apart spines. The basket or tray 302 is positioned below the handle, but at a height relative to the first and second transverse horizontal members 162 and 164 sufficient to essentially block the opening between the first and second horizontal transverse members. Associated with the tray or basket 302 are cup or bottle holders 308 and 309, which as shown include nearly circular support portions for tightly engaging a portion of a cup or bottle placed in the holder, and transverse support elements disposed beneath the circular support portions at a predetermined depth to support the bottom of the cup or bottle that has been disposed in the holder.

In another instance, a merchandise carrier comprises a tray 312 positioned behind and below the rear portion of the basket B. The tray 312 includes a rear portion that is secured to the transversely extending cross member 122, and a forward portion that is secured to the rear of the pedestal 130. Preferably, the tray 312 has a front-to-rear "depth" dimension having a size sufficient to fit and support a large carton or bag of merchandise, such as a carton of sodas or beer, and/or a bag of charcoals or pet food. The carrier 312 is provided as a substitute for the under-basket tray normally found on "conventional" shopping carts. It is to be understood that, in view of the fact that the basket B of the cart of the invention is disposed so far down on the frame, an under-basket tray or shelf in the shopping cart of the present invention would not be useful because there is insufficient storage space between the bottom of the basket and the wheeled base of the frame.

Inside the basket B of the shopping cart, at the front, a shelf or tray 316 can be positioned and moved between a functional, unfolded, position (as is shown in FIG. 4) and a non-functional stowed or folded position in which the forward end of the merchandise supporting shelf portion 316 is attached to the front panel of the basket B at pivot P1, and the rearward end of the shelf portion 316 is pivotably attached to a pivoting panel 318 which itself is attached at a pivot P2 at its forward end to a lower region of the front panel of the basket B. A variation of the front shelf can constitute a fixed horizontal shelf portion 320 that spans the distance between the side panels of the basket, and a substantially vertical back portion 321. The shelf 320 is preferably mounted to the side panels of the basket at a height that is close to the upper edge of the basket B.

Disposed on opposite sides of the rear portion of the basket, in proximity to the handle, are upstanding side guard panels 402,404. The side guard panels effectively function as upwardly directed extensions of the side guard panels of the basket. The rearward edges 406, 408 of the side guard panels are attached to the spine members 152, 154 at the rear portion of the basket B, and the bottom edges of the side guard panels are secured to the upper rim 184 of the basket B. The main purpose of the side guard panels, when secured in place, is to protect the head and torso of a child seated in the child's seat against injury in the unlikely event that the cart tips over, or where the cart is wheeled into an unsafe location, or into a position where the child could be at risk for injury from exterior lateral forces, such as where the cart in which the child is seated is rammed by another cart or pushed into a shelf or other potentially harmful object.

Noting FIGS. 3-5 again, it can be seen that the forward portion of the basket B includes a second wire 188 having a nearly U-shape to correspond with the outer perimeter of the front of the basket B. The second wire 188 is supported above and substantially parallel to the upper wire 184 of the basket B. The U-shaped wire 188 defines at its rearward end a stop 190 where the wire 188 is joined to the upper wire 184 of the basket. The stop 190 faces toward, and cooperates with, the spine members 152 and 154 in the case where the side guard panels 402, 404 are not attached to the basket B, or with the forward edges of the side guard panels 402, 404 when these panels are attached, to enable the placement of merchandise atop and across the upper edge of the basket between the stop 190 and the forward edges of the side guard panels.

FIG. 6 shows another shopping cart of the invention in which a tray 502 is supported behind and below the handle 156. Tray 502 is connected to the spines 152, 154 behind the basket in a manner similar to the manner of connection described for the tray 302 shown in FIGS. 3-5. In the cart shown in FIG. 6, a barrier member 510 comprising a grillwork panel is secured between the upper and lower transverse members 162, 164, and located in the plane defined by elements denoted by the reference numbers 162, 164, 152, 154 in the cart of the invention. The barrier member 510 functions to block the space between the transverse members 162, 164 and cooperate with the side guard panels to form a protective enclosure or cage for a child seated in the child seat of the cart.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

We claim:

1. A shopping cart, comprising:
   a wheeled base having forward and rear portions,
   a container supported by said base,
   said base including a handle member extending upwardly from, and attached to, said base,
   a gate member pivotably attached to said handle member at the rear of said container and being functionally arranged therewith to act as a closure for the rear of the container,
   a pedestal formed on said base for supporting said container thereon,
      said pedestal being secured to said base at a location between the forward and rearward ends of said base,
   said container being supported on, and secured to, said pedestal at a fixed location on said base so that the rear of said container is disposed forwardly of the rear of the base, and
   a merchandise carrier disposed between and attached to the rear of the wheeled base and the pedestal,
   wherein said pedestal includes a surface for supporting the rear of the basket forwardly of the rear of the base, and said basket is hung from said handle member at a location disposed a substantial distance from the upper part of said handle member, such that said cart possesses a lowered center of gravity.

2. The shopping cart of claim 1, wherein said basket includes front, back, bottom, and side panels, and said pedestal includes a table portion on which the rear portion of the bottom panel of said basket sits.

3. The shopping cart of claim 2, wherein said table portion of said pedestal is substantially horizontally arranged.

4. The shopping cart of claim 2, wherein said table portion is slightly inclined relative to the base.

5. The shopping cart of claim 4, wherein the back of said table portion is lower than the front of said table portion.

6. The shopping cart of claim 1, wherein said handle member includes a U-shaped handle portion at a top end thereof and a pair of connecting rods for connecting said handle member to said pedestal at the rear of said table portion.

7. The shopping cart of claim 1, wherein the lower region of said handle includes a base attachment member having a forward attachment region and a rearward attachment region, said base attachment member being disposed rearwardly of said table portion.

8. The shopping cart of claim 7, wherein said forward attachment region is secured to the table portion and the rearward attachment region is secured to the rear of said base.

9. The shopping cart of claim 8, wherein said forward attachment region of said handle member is secured to the rear portion of said table portion.

10. The shopping cart of claim 9, wherein said pedestal table portion is supported on resilient elements connected to the base, and the space between said basket and said base is minimized to the extent that its use as storage for merchandise has effectively been eliminated.

11. The shopping cart of claim 1, and further including a pair of vertically spaced apart hinge rods, a first one of said hinge rods being located in the vicinity of the upper end of said handle member and being disposed on said handle member at a first height, and the other of said hinge rods being disposed lower than said first one of said hinge rods, the lower hinge rod pivotably securing the rear gate of said basket.

12. The shopping cart of claim 1, and further including a child seat at the rear of the basket, said child seat being disposed at a height substantially below the height of the upper end of the handle member.

13. The shopping cart of claim 12, wherein said child seat pivots between a non-functional position in which the rear of the child seat is disposed adjacent the rear gate of the basket and a functional position in which the rear of the child seat is pivoted forwardly into the basket, and further wherein said child seat includes a seat portion on which a child sits when said child seat is in said functional position, said seat portion being disposed below the other of said hinge rods.

14. The shopping cart of claim 1, wherein the width of the rear portion of the wheeled base is substantially greater than the width of the forward portion of the wheeled base.

15. A shopping cart frame, comprising:
   a wheeled base having forward and rear portions,
   a handle member including two horizontally arranged, vertically spaced apart,
   substantially parallel rods attached to said handle member,
   a container,
   a pedestal formed on said base for supporting said container thereon,
      said pedestal being mounted to said base at a location between the forward and rearward ends of said base and at a height relative to said base such that the space between the pedestal and the base is minimized to such an extent that its use as storage for merchandise has been effectively eliminated, said pedestal further including elements defining means for engaging the first container and holding it such that the rear of the first container is disposed forwardly of the rear of the base, and at a height relative to the base which is substantially below the height of the uppermost parallel rod, and a first tray, disposed behind said first container, and secured to said pedestal and said base, whereby the frame and first tray together possess a center of gravity that is lower than the center of gravity of container and frame combinations of conventional shopping carts.

16. The shopping cart frame of claim 15, wherein said base includes a second tray disposed above the container.

17. The shopping cart frame of claim 15, wherein said base includes side rails and casters mounted to the side rails for enabling rolling movement of said base on a horizontal surface, and further including a handle assembly mounted to said base, said handle assembly comprising vertically arranged spine members extending upwardly from said base, said spine members being laterally spaced apart and terminating in a handle defining a handle plane, said spine members including a pair of vertically spaced apart horizontal rod members extending between and connected to the spine members and disposed substantially normal to said spine members and being located between said handle plane and said base assembly.

18. The shopping cart frame of claim 17, wherein the upper one of said rod members lies substantially nearly in said handle plane, and the lower one of said rod members is disposed below said upper rod at a height corresponding with, and forming the pivot connection for, a pivoting rear gate of said container.

19. The shopping cart frame of claim 17, wherein said pedestal surface means and the lower one of said rod members are arranged relative to one another such that when said first container is disposed on said pedestal surface means, the container and the pivot connection for the rear gate of the container will be located substantially below said handle plane.

20. The shopping cart frame of claim 17, and further including connecting rods projecting from said spine members forwardly and downwardly into securement with the rear of said pedestal for supporting said pedestal against excessive longitudinal forces.

21. The shopping cart frame of claim 17, and further including resilient support elements connected between said pedestal and said side rails of said base for supporting said pedestal against excessive vertical forces.

22. The shopping cart frame of claim 15, wherein the width of the rear portion of the wheeled base is substantially greater than the width of the forward portion of the wheeled base.

23. A shopping cart with a center of gravity lower than the center of gravity of conventional shopping carts, comprising:

a wheeled base, said base including a handle and support members connecting the handle to the wheeled base, a basket support structure on said base, said basket support structure being disposed forwardly of the rear of the wheeled base, a basket mounted on said basket support structure, and suspended from the support members at a position substantially below said handle, two merchandise carriers disposed behind said basket, one merchandise carrier being disposed below said basket and secured between said basket support structure and the rear of the wheeled base, wherein said support members include a pair of horizontal, parallel, vertically spaced cross members, and wherein said basket includes a pivoting rear gate, said rear gate being pivotably supported from the lower of the two parallel cross members.

24. The shopping cart of claim 23, wherein said rear gate includes child seat structure, and said child seat structure is positioned at a lower location relative to said handle than the location of child seat structure of conventional shopping carts.

25. The shopping cart of claim 23, and further wherein the other merchandise carrier is disposed above said base.

26. The shopping cart of claim 25, wherein said second merchandise carrier is located in the vicinity of, and behind, said handle.

27. The shopping cart of claim 25, wherein said other merchandise carrier is located in said basket.

* * * * *